US008010112B1

(12) United States Patent
Delker et al.

(10) Patent No.: US 8,010,112 B1
(45) Date of Patent: Aug. 30, 2011

(54) METHOD AND SYSTEM USING A MEDIA GATEWAY FOR HANDOFF OF A MULTI-MODE MOBILE STATION

(75) Inventors: Jason R. Delker, Olathe, KS (US); John M. Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1350 days.

(21) Appl. No.: 11/117,681

(22) Filed: Apr. 28, 2005

(51) Int. Cl.
*H04W 36/36* (2009.01)
*H04W 36/02* (2009.01)
*H04M 1/03* (2006.01)

(52) U.S. Cl. .................. 455/437; 455/552.1; 455/444

(58) Field of Classification Search .......... 455/436–444, 455/552.1–553.1, 456.3, 414.1, 418, 566, 455/527, 419, 416, 413
See application file for complete search history.

(56) References Cited

U.S. PATENT DOCUMENTS

| | | | | |
|---|---|---|---|---|
| 6,128,287 | A * | 10/2000 | Freeburg et al. | 370/331 |
| 6,405,033 | B1 * | 6/2002 | Kennedy, III et al. | 455/414.1 |
| 6,473,624 | B1 * | 10/2002 | Corbett et al. | 455/522 |
| 6,680,923 | B1 | 1/2004 | Leon | |
| 6,721,565 | B1 | 4/2004 | Ejzak et al. | |
| 6,987,985 | B2 * | 1/2006 | Purkayastha et al. | 455/552.1 |
| 7,489,929 | B2 * | 2/2009 | Das et al. | 455/436 |
| 7,518,994 | B2 * | 4/2009 | Zhang et al. | 370/235 |
| 2002/0045450 | A1 * | 4/2002 | Shimizu et al. | 455/442 |
| 2002/0085516 | A1 | 7/2002 | Bridgelall | |
| 2002/0147008 | A1 | 10/2002 | Kallio | |
| 2003/0027569 | A1 | 2/2003 | Ejzak | |
| 2003/0125028 | A1 | 7/2003 | Reynolds | |
| 2003/0133421 | A1 | 7/2003 | Sundar et al. | |
| 2003/0134636 | A1 | 7/2003 | Sundar et al. | |
| 2003/0134638 | A1 | 7/2003 | Sundar et al. | |
| 2003/0134650 | A1 | 7/2003 | Sundar et al. | |
| 2004/0146021 | A1 | 7/2004 | Fors et al. | |
| 2004/0192294 | A1 | 9/2004 | Pan et al. | |
| 2004/0203788 | A1 | 10/2004 | Fors et al. | |
| 2004/0203791 | A1 | 10/2004 | Pan et al. | |
| 2004/0218575 | A1 | 11/2004 | Ibe et al. | |
| 2004/0246990 | A1 | 12/2004 | Krishnamurthi et al. | |
| 2004/0264410 | A1 * | 12/2004 | Sagi et al. | 370/331 |
| 2004/0266426 | A1 | 12/2004 | Marsh et al. | |
| 2005/0047435 | A1 | 3/2005 | Segal et al. | |

(Continued)

OTHER PUBLICATIONS

J. Rosenberg and H. Schulzrinne, "Models for Multi Party Conferencing in SIP," Internet Draft, Jul. 1, 2002.

(Continued)

*Primary Examiner* — Matthew Sams

(57) ABSTRACT

A multi-mode mobile station includes a first interface for wireless communication with a wireless local area network (WLAN) and a second interface for wireless communication with a wireless wide area network (WWAN). A call control system routes all calls to and from the multi-mode mobile station through a media gateway that serves as an anchor point for handoffs between the WLAN and WWAN. For example, while involved in a call that has a WLAN call leg from the media gateway, the multi-mode mobile transmits a handoff request. The call control system then establishes a WWAN call leg from the media gateway, and the multi-mode mobile station stores in a buffer any media received via the WWAN call leg. The call control system subsequently transmits a handoff instruction to the multi-mode mobile station. In response, the multi-mode mobile station plays out the stored media and drops the WLAN call leg.

10 Claims, 5 Drawing Sheets

U.S. PATENT DOCUMENTS

2005/0070288 A1 3/2005 Belkin et al.
2005/0265345 A1* 12/2005 Chen et al. .................... 370/392
2006/0142008 A1* 6/2006 Lee et al. ....................... 455/436
2006/0154665 A1* 7/2006 Svensson et al. .............. 455/436
2006/0223534 A1* 10/2006 Newberg et al. .............. 455/436
2007/0087748 A1 4/2007 Du et al.

OTHER PUBLICATIONS

J. Rosenberg, "The Session Initiation Protocol (SIP) UPDATE Method," Request for Comments 3311, Sep. 2002.
Lucent Technologies, "IP Multimedia Subsystem (IMS) Service Architecture," 2004.

* cited by examiner

METHOD AND SYSTEM USING A MEDIA GATEWAY FOR HANDOFF OF A MULTI-MODE MOBILE STATION

BACKGROUND

1. Field of the Invention

The present invention relates to telecommunications and, more particularly, to a method and system that uses a media gateway for handoff of a multi-mode mobile station from a first wireless network to a second wireless network.

2. Description of Related Art

There is an increased interest in using more diverse types of wireless access technologies for mobile devices. Different wireless access technologies may be used to provide wireless coverage in different geographic areas. In addition, different wireless access technologies may be used to provide different capabilities for transmitting and receiving voice, data, and/or other media. For example, wireless wide area networks (WWANs), which often use wireless access technologies such as CDMA, TDMA, or GSM, typically provide wireless coverage in relatively large geographic areas. However, in many cases, WWANs do not provide good wireless coverage in buildings. In addition, many WWANs have a relatively limited bandwidth for transmitting and receiving media. However, wireless local area networks (WLANs), which may use wireless access technologies, such as IEEE 802.11, Bluetooth, HiperLAN, or HomeRF, have been used to provide wireless coverage in more limited areas, such as the inside of buildings. In addition, WLANs can often transmit and receive media at a higher rate than many WWANs.

With this increased interest in using diverse wireless access technologies to provide wireless coverage has come an increased interest in providing multi-mode mobile stations that can communicate using more than one type of wireless access technology. For example, a multi-mode mobile station may have one interface for communication with a WWAN, using a wireless access technology such as CDMA, and another interface for communication with a WLAN, using a wireless access technology such as IEEE 802.11. Although such multi-mode mobile stations can provide better wireless coverage in more areas by being able to communicate over different wireless networks, they do not necessarily change their network connectivity in a seamless manner. For example, while engaged in a call via a first wireless network, the multi-mode mobile station may move into an area in which the first wireless network no longer provides good wireless coverage but the second wireless network does. In that situation, it would be desirable for the multi-mode mobile station to be able to continue the call via the second wireless network.

Accordingly, there is a need for methods and systems that can facilitate handoffs of multi-mode mobile stations, for example, from a WWAN to a WLAN or vice versa.

SUMMARY

In a first principal aspect, an exemplary embodiment of the present invention provides a method for call handoff between a first wireless network and a second wireless network for a multi-mode mobile station. The multi-mode mobile station includes a first interface for wireless communication with the first wireless network and a second interface for wireless communication with the second wireless network. In accordance with the method, the multi-mode mobile station transmits a handoff request via the first interface while the multi-mode mobile station is engaged in a first communication session with an endpoint via the first interface. The multi-mode mode mobile becomes engaged in a second communication session with the endpoint via the second interface and begins receiving media via the second interface. The multi-mode mobile station stores the media, thereby accumulating stored media. The multi-mode mobile station receives a handoff instruction via the first interface. In response to the handoff instruction, the multi-mode mobile station conveys the stored media to a user and drops the first communication session.

In a second principal aspect, an exemplary embodiment of the present invention provides a method for effecting a handoff of a multi-mode mobile station from a first wireless network to a second wireless network. The multi-mode mobile station has a first interface for wireless communication with the first wireless network and a second interface for wireless communication with the second wireless network. In accordance with the method, a call request is received that requests establishment of a call between the multi-mode mobile station and an endpoint. In response to the call request, a first call leg for the call is established between an anchor point and the multi-mode mobile station via the first wireless network. A handoff request from the multi-mode mobile station is received via the first wireless network. In response to the handoff request, a second call leg for the call is established between the anchor point and the multi-mode mobile station via the second wireless network and a handoff instruction is transmitted to the multi-mode mobile station via the first wireless network. The first call leg is dropped.

In a third principal aspect, an exemplary embodiment of the present invention provides a system for providing wireless telecommunications to a multi-mode mobile station. The multi-mode mobile station has a first interface for wireless communication with the first wireless network and a second interface for wireless communication with the second wireless network. The system comprises a media gateway that is communicatively coupled to the first and second wireless networks and a call control system that is communicatively coupled to the media gateway. The call control system routes calls to and from the multi-mode mobile station through the media gateway and controls handoffs of the calls between the first and second wireless networks.

DETAILED DESCRIPTION OF EXEMPLARY EMBODIMENTS

1. Overview

Figure 1:
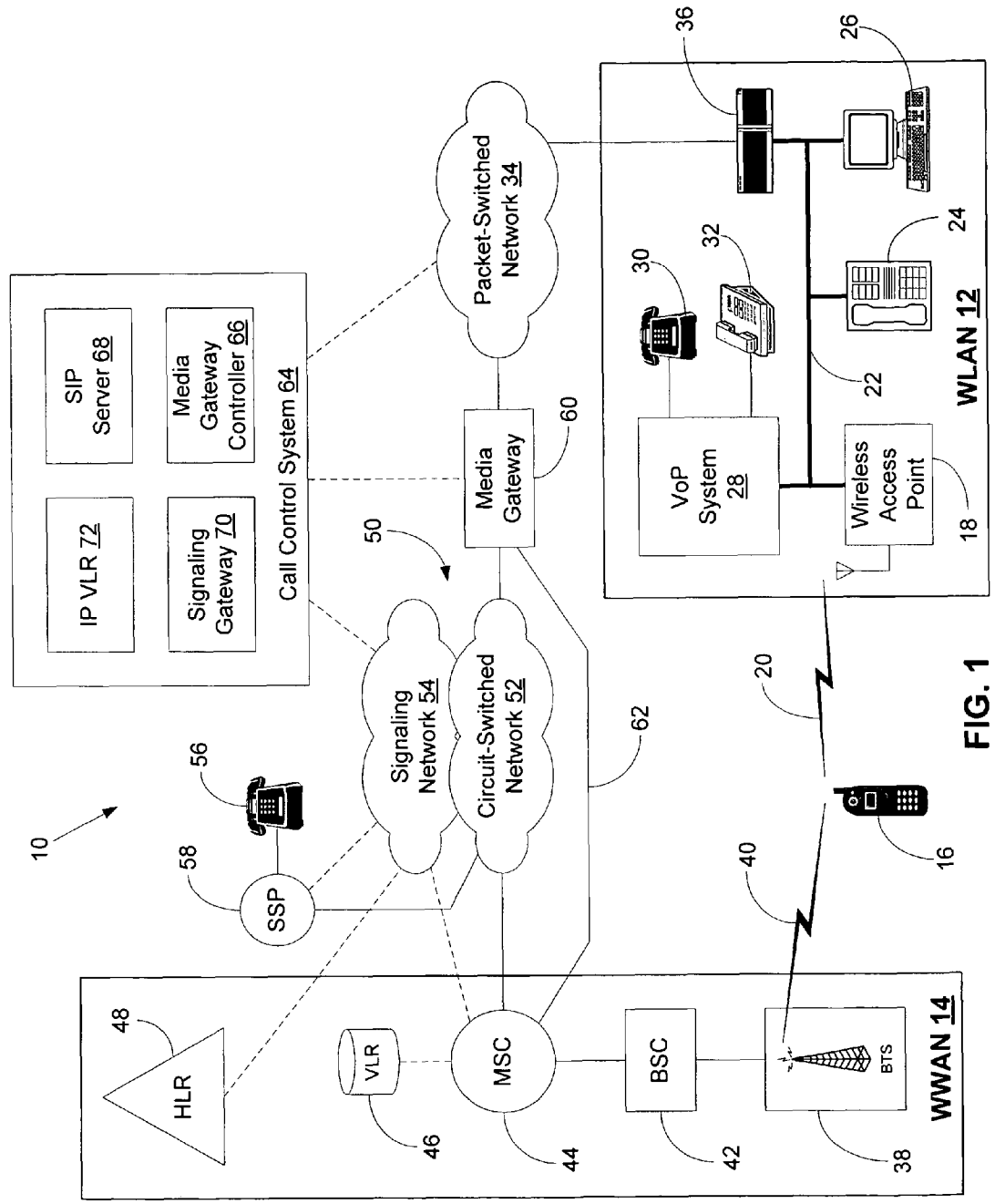
FIG. 1 is a simplified block diagram of a wireless telecommunications system, in accordance with an exemplary embodiment of the present invention.

The present invention, in its preferred embodiments, facilitates call handoffs between a first wireless network and a second wireless network for multi-mode mobile stations. The first and second wireless networks use different wireless communication technologies. For example, the first wireless network could be a wireless local area network (WLAN) that uses a protocol such as IEEE 802.11x, HiperLAN, HomeRF, Bluetooth for wireless communication. The second wireless network could be a wireless wide area network (WWAN) that uses, for example, CDMA or GSM for wireless communication. Thus, a multi-mode mobile station may have at least a first interface for wireless communication with the first wireless network and a second interface for wireless communication with the second wireless network.

In an exemplary embodiment, a media gateway that is communicatively coupled to the first wireless network and to the second wireless network is used as an anchor point for call handoffs for multi-mode mobile stations. The media gateway may be controlled by a softswitch or other call control system, which may route all calls to and from a multi-mode mobile station through the media gateway. Thus, when the call control system establishes a call between the multi-mode mobile station and an endpoint via the first wireless network, the call includes a call leg that extends from the media gateway to the multi-mode mobile station via the first wireless network. Similarly, when the call control system establishes a call between the multi-mode mobile station and an endpoint via the second wireless network, the call includes a call leg that extends from the media gateway to the multi-mode mobile station via the second wireless network.

The call control system may also control call handoffs between the first and second wireless networks for multi-mode mobile stations. In an exemplary embodiment, the multi-mode mobile station initiates the handoffs. For example, while a multi-mode mobile station is involved in a call with an endpoint via its first interface, so that the call includes a first call leg extending from the media gateway to the multi-mode mobile station via the first wireless network, the multi-mode mobile station may determine that the second wireless network is available and preferred. This may occur, for example, when the multi-mode mobile station is moving out of the coverage area of the first wireless network and into the coverage area of the second wireless network.

In response to this determination, the multi-mode mobile station may use its second interface to register with the second wireless network and may use its first interface to transmit a handoff request to the first wireless network. The call control system receives the handoff request and responsively attempts to establish a second call leg that extends from the media gateway to the multi-mode mobile station via the second wireless network. To establish the second call leg, the second wireless network may transmit an incoming call request that includes a caller identification that identifies the multi-mode mobile station. The multi-mode mobile station may recognize from this caller identification that the incoming call request is part of the handoff process and, as a result, may answer it automatically.

Once the second call leg is established, the multi-mode mobile station may begin receiving voice or other media (e.g., from the endpoint involved in the call) via its second interface. The multi-mode mobile station may store this media, thereby accumulating stored media, until instructed to convey it to the user by the call control system. In this regard, the call control system may wait until it receives signaling that confirms that the second call leg has been successfully established. When the call control system receives this confirmation, it may transmit a handoff instruction to the multi-mode mobile station via the first wireless network.

When the multi-mode mobile station receives the handoff instruction, the multi-mode mobile station may responsively (i) convey the stored media to the user, (ii) drop the first call leg, and (iii) continue the call using the second call leg. In this way, a call handoff from the first wireless network to the second wireless network is effected. In addition, because the second call leg is established before the first call leg is dropped, this approach can beneficially effect a "soft" handoff between the first and second wireless networks.

2. Exemplary Network Architecture

FIG. 1 is a simplified block diagram of an exemplary wireless telecommunications system 10. In FIG. 1, connections that carry primarily voice or other media are shown as solid lines and connections that carry primarily signaling are shown as dashed lines.

Wireless telecommunications system 10 includes network elements that function together as a wireless local area network (WLAN) 12 and network elements that function together as a wireless local area network (WWAN) 14. WLAN 12 may provide wireless coverage in a relatively limited area, such as in a building or part of a building. In addition, WLAN 12 may use one or more unlicensed frequency bands, such as the unlicensed frequency band in the 2.4 GHz range. For example, WLAN 12 may use IEEE 802.11a, IEEE 802.11b, IEEE 802.11e, IEEE 802.11g, or IEEE 802.11h (wherein these and other members of the IEEE 802.11 family of specifications are referred to generically herein as "802.11x"), or variations thereof, for wireless communication. These 802.11x standards are incorporated herein by reference. Alternatively or additionally, WLAN 12 may use IEEE 802.16, Bluetooth, HomeRF, HiperLAN, a Multichannel Multipoint Distribution Service (MMDS), or some other wireless protocol or format for wireless communication.

WWAN 14 may provide wireless coverage in a relatively large geographic area, such as an entire city, often by using a plurality of contiguous wireless coverage areas, such as cells or sectors. The wireless communication in WWAN 14 may occur in an analog format, such as the Advanced Mobile Phone Service (AMPS), or in a digital format, such as code division multiple access (CDMA), time division multiple access (TDMA), or Global System for Mobile communication (GSM), and it may occur in licensed frequency bands, such as the 1.9 GHz PCS bands.

A multi-mode mobile station 16 has a first interface for wireless communication with WLAN 12 and a second interface for wireless communication with WWAN 14. Thus, multi-mode mobile station 16 is able to communicate with WLAN 12 when operating in an area served by WLAN 12 and is able to communicate with WWAN 14 when operating in an area served by WWAN 14. In some areas, the wireless coverage of WLAN 12 and WWAN 14 may be overlapping, and multi-mode mobile station 16 may use an arbitration method to determine whether to communicate with WLAN 12 or with WWAN 14.

Multi-mode mobile station 16 may be a wireless telephone, wirelessly-equipped personal digital assistant (PDA), wirelessly-equipped laptop computer, or other type of wireless communication device. The first and second interfaces of multi-mode mobile station 16 may each include an antenna, a radio frequency (RF) transceiver, and a communication module appropriate for communicating using the particular wireless technology. A communication module may be implemented by hardware, firmware, and/or software.

WLAN 12 includes at least one wireless access point 18. Wireless access point 18 provides a wireless coverage area within which wireless access point 18 is able to communicate with wireless communication devices, such as multi-mode mobile station 16, over an air interface 20. Wireless access point 18 may be communicatively coupled to other network elements, e.g., via a local area network (LAN) 22. LAN 22 may carry voice, data, and/or other media in a packet-based format. Thus, LAN 22 may be connected to other communication devices that exchange voice in a packet-based format. For example, LAN 22 may be connected to a voice-over-packet (VoP) telephone 24, a personal computer 26 equipped for audio communication, e.g., equipped with a microphone and speaker, and/or one or more other wireless access points.

LAN 22 may also be connected to a VoP system 28 that controls VoP communications in WLAN 12. VoP system 28 may, for example, function as a private branch exchange, such as an "IP-PBX," and/or a media terminal adapter (MTA). VoP system 28 may, in turn, be communicatively coupled to a variety of wireline and/or wireless communication devices. For example, VoP system 28 may be connected to analog telephony devices, such as analog telephone 30, facsimile machines, and/or modems. VoP system 28 may also be connected to digital telephony devices, such as digital telephone 32.

LAN 22 may be communicatively coupled to a wide area packet-switched network 34, via a network access device 36. Network access device 36 could be, for example, a cable modem, DSL modem, or router. Packet-switched network 34 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 34 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP), may be used to set up and/or manage communication sessions through packet-switched network 34. Voice, data, and/or other media may be exchanged in such communication sessions. Relevant aspects of SIP are described in Rosenberg, et al., "SIP: Session Initiation Protocol," Request for Comments 3261 (June 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In an exemplary embodiment, SIP is used to set up communication sessions through packet-switched network 34 that involve WLAN 12. WLAN 12 may include one or more SIP user agents for this SIP signaling. For example, VoP system 28 may include a SIP user agent to engage in SIP signaling on behalf of multi-mode mobile station 16 or other communication devices communicatively coupled to WLAN 12. Alternatively, multi-mode mobile station 16 may have its own SIP user agent.

WWAN 14 may include a base transceiver station (BTS) 38 that provides a wireless coverage area within which BTS 38 may communicate with one or more mobile stations, such as multi-mode mobile station 16, over an air interface 40. Although FIG. 1 shows only one BTS, it is to be understood that WWAN 14 may include a plurality of BTSs that may provide a plurality of wireless coverage areas. The communications between BTS 38 and multi-mode mobile station 16 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma2000 such as described in EIA/TIA/IS-2000 Series, Rev. A (published March 2000), which is incorporated herein by reference.

BTS 38 may be controlled by a base station controller (BSC) 42, which, in turn, may be controlled by a mobile switching center (MSC) 44. Although FIG. 1 shows only one MSC and only one BSC, it is to be understood that WWAN 14 may include a plurality of MSCs, which may, in turn, control a plurality of BTSs, via a plurality of BSCs. MSC 44 also has access to a visitor location register (VLR) 46. VLR 46 stores data records for mobile stations, such as multi-mode mobile station 16, that are being served by MSC 44. A data record stored in VLR 46 for a mobile station may identify the mobile station, e.g., by mobile directory number (MDN), mobile station identification (MSID), and/or electronic serial number (ESN). The data record may also include status information for the mobile station, such as whether the mobile station is busy, and may also include a service profile that identifies the services to which the mobile station subscribes. The data record may also include other information relating to the mobile station. Although FIG. 1 shows VLR 46 as a network element separate from MSC 44, VLR 46 may be integrated or co-located with MSC 44.

WWAN 14 may also include a home location register (HLR) 48 that stores a data record for multi-mode mobile station 16. The data record stored in HLR 48 for multi-mode mobile station 16 may identify multi-mode mobile station 16, such as by MDN, MSID, and/or ESN and may include a last known location of multi-mode mobile station 16. For example, the data record may identify the VLR that most recently registered multi-mode mobile station 16 with HLR 48. The data record may also include status information for multi-mode mobile station 16, a service profile for multi-mode mobile station 16, and other information relating to multi-mode mobile station 16.

MSC 44 is connected to the public switched telephone network (PSTN) 50. PSTN 50 may use an out-of-band signaling system, such as Signaling System 7 (SS7) to route calls. Thus, PSTN 50 may include a circuit-switched network 52 that carries bearer traffic, i.e., the voice or other media in calls, and a signaling network 54 that carries signaling traffic used to set up, tear down, monitor, and control calls. Circuit-switched network 52 may include a plurality of trunks, with each trunk carrying media in a time division multiplex (TDM) format. Signaling system 54 may include a plurality of networked signal transfer points (STPs).

PSTN 50 may also be connected to various landline telephony endpoints, exemplified in FIG. 1 by landline telephone 56. More particularly, landline telephone 56 may be connected to a switching system, such as service switching point (SSP) 58, which, in turn, may have a bearer connection to circuit-switched network 52 and a signaling connection to signaling network 54.

MSC 44 may communicate with signaling network 54, e.g., using SS7, to route calls via circuit-switched network 52 to and from mobile stations being served by WWAN 14, such as multi-mode mobile station 16. To provide telecommunications services to mobile stations being served by WWAN 14, such as multi-mode mobile station 16, MSC 44 may also communicate with HLR 48 via signaling network 54. The communications between MSC 44 and HLR 48 may conform to IS-41 specifications. A recent revision of the IS-41 specifications, ANSI/TIA/EIA-41-D-97, published in December 1997, is incorporated herein by reference. The IS-41 signaling may be carried in signaling network 54 as an SS7 application layer.

Packet-switched network 34 may be communicatively coupled to circuit-switched network 52, via a media gateway 60. Media gateway 60 may convert between media formats used in circuit-switched network 52 and packet-switched network 34. For example, media gateway 60 may receive media from circuit-switched network 52 in a TDM format and convert the media into an RTP format for transmission over packet-switched network 34, and vice-versa. Media gateway 60 may also be connected to, or integrated with, MSCs, such as MSC 44. Thus, MSC 44 may have a bearer connection with media gateway 60 via an intermachine trunk 62.

Wireless telecommunications system 10 may include a call control system 64 that functions to route calls to and from multi-mode mobile stations, such as multi-mode mobile station 16, through media gateway 60. Call control system 64 may include a number of functional components. For example, call control system 64 may include a media gateway controller 66, a SIP server 68, a signaling gateway 70, and an IP VLR 72. These components may be provided in a single network element, such as softswitch or a call session control function (CSCF). Alternatively, these components may be distributed among multiple network elements.

Media gateway controller 66 may function to control media gateway 60, for example, to extend calls from PSTN 50 to packet-switched network 34, or vice versa. Media gateway controller 66 may communicate with media gateway 60 via a signaling link, e.g., using the Media Gateway Control Protocol (MGCP). Relevant aspects of MGCP are described in F. Andreason, et al., "Media Gateway Control Protocol (MGCP) Version 1.0," Request for Comments 3435 (January 2003), which is incorporated herein by reference.

SIP server 68 may communicate with SIP user agents (which may be included in multi-mode mobile stations or in other network elements, such as VoP system 28, that act on behalf of multi-mode mobile station) to set up and control voice calls and other communication sessions through packet-switched network 34. More particularly, SIP server 68 may function as a SIP registrar that registers SIP user agents through the use of the SIP REGISTER method. SIP server 68 may also function as a SIP proxy server, e.g., to set up communication sessions using the SIP INVITE method. Signaling gateway 70 functions to convert between the signaling format used in packet-switched network 34, e.g., SIP, and the signaling format used in signaling network 54, e.g., SS7 and IS-41. Thus, using signaling gateway 70, call control system 64 can route calls that originate from PSTN 50 through packet-switched network 34 and can route calls that originate from packet-switched network 34 through PSTN 50.

IP VLR 72 serves as a visitor location register for packet-switched network 34, storing a data record for each multi-mode mobile station that has registered via packet-switched network 34. More particularly, when a multi-mode mobile station associates with WLAN 12, the multi-mode mobile station may register for services via packet-switched network 34, e.g., by sending a SIP REGISTER message to SIP server 68. In response, call control system 64 may obtain a data record for that multi-mode mobile station from HLR 48, e.g., by having signaling gateway 70 send an IS-41 REGNOT message to HLR 48, and then store that data record in IP VLR 72. In this way, IP VLR 72 keeps track of which multi-mobile stations are currently being served by WLAN 12.

3. Exemplary Operation

Figure 2:
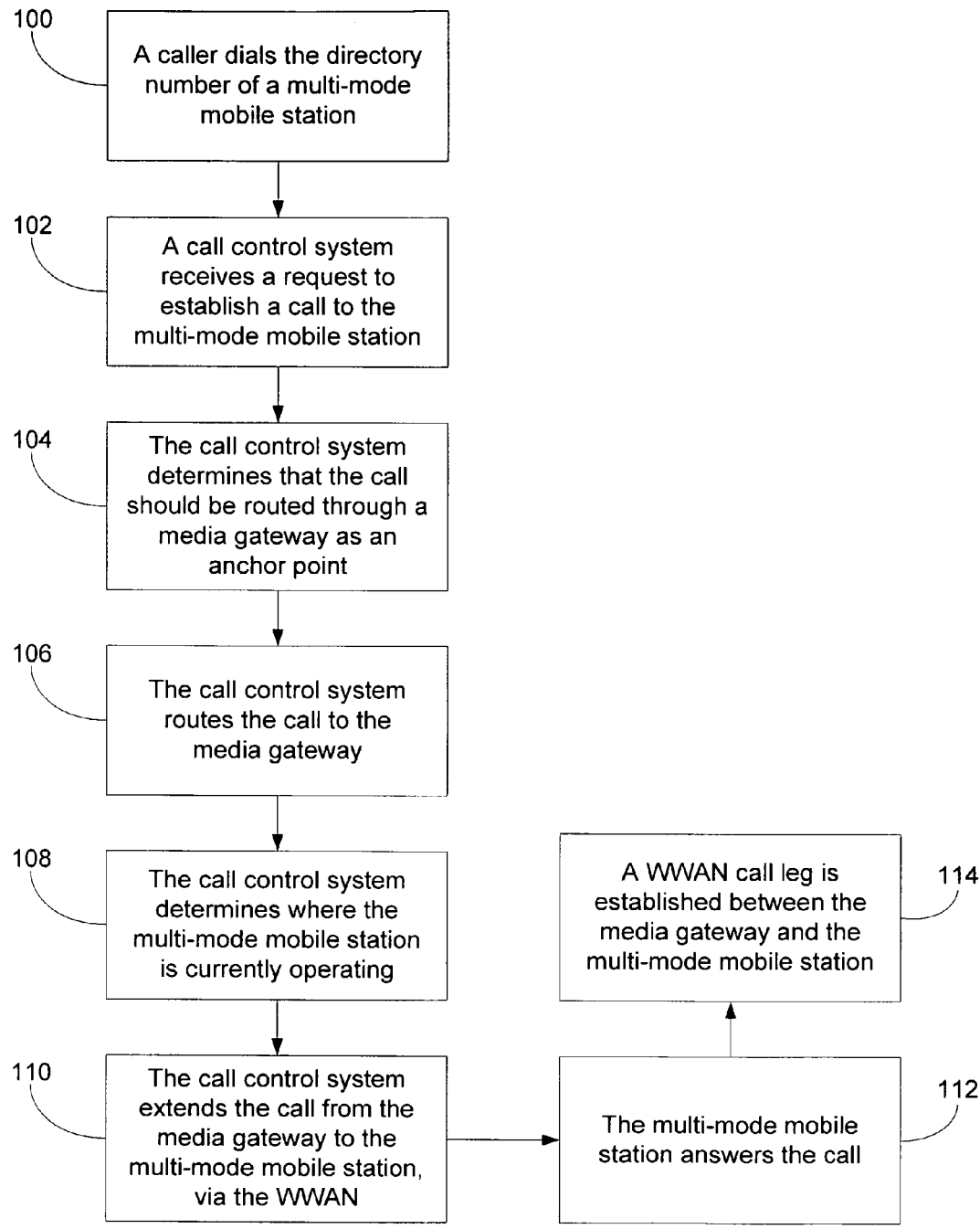
FIG. 2 is a flow chart illustrating a method for establishing a call between an endpoint and a multi-mode mobile station via a WWAN, in accordance with an exemplary embodiment of the present invention.
Figure 3:
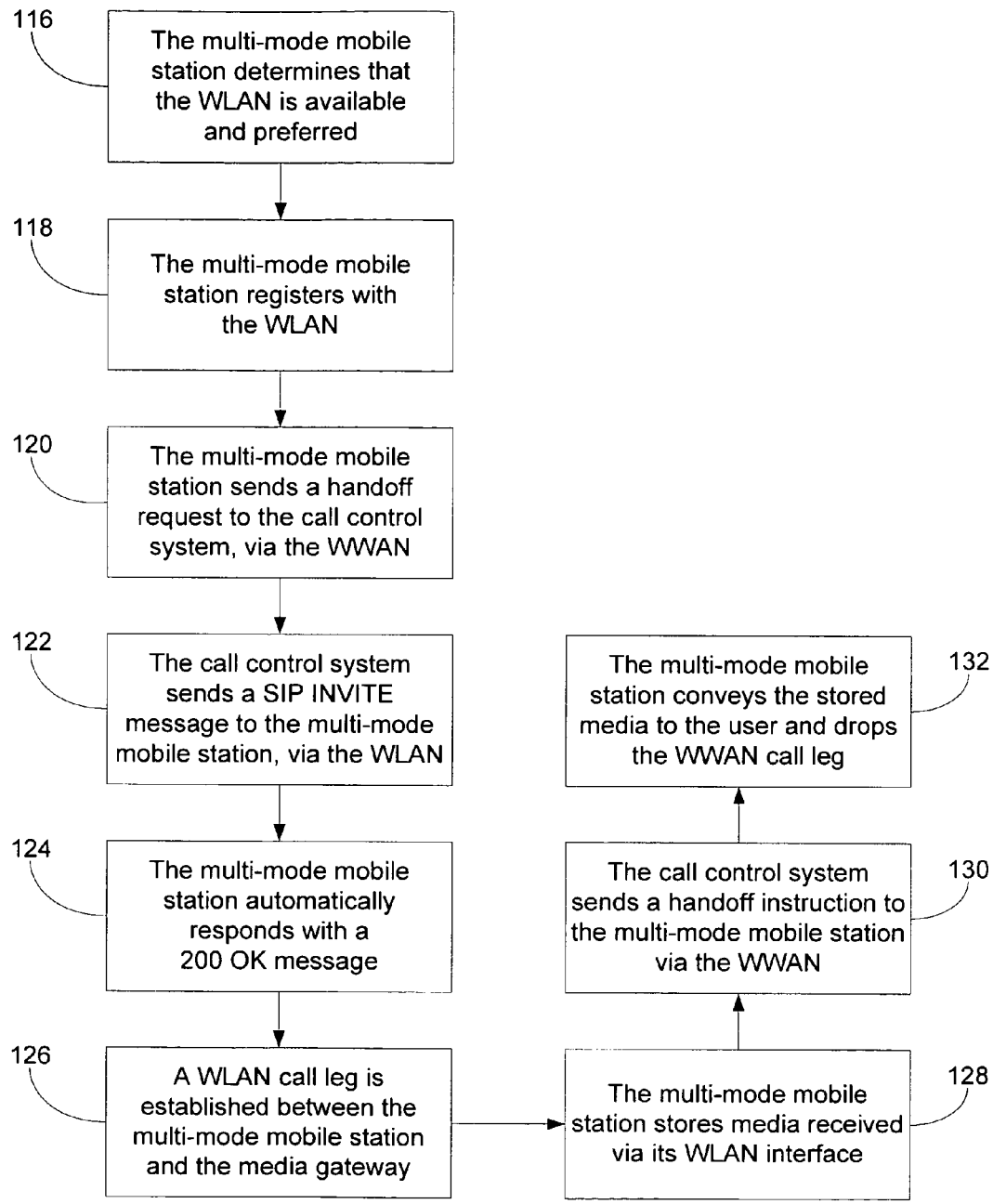
FIG. 3 is a flow chart illustrating a method for handing off the call established in FIG. 2 from the WWAN to a WLAN, in accordance with an exemplary embodiment of the present invention.
Figure 4:
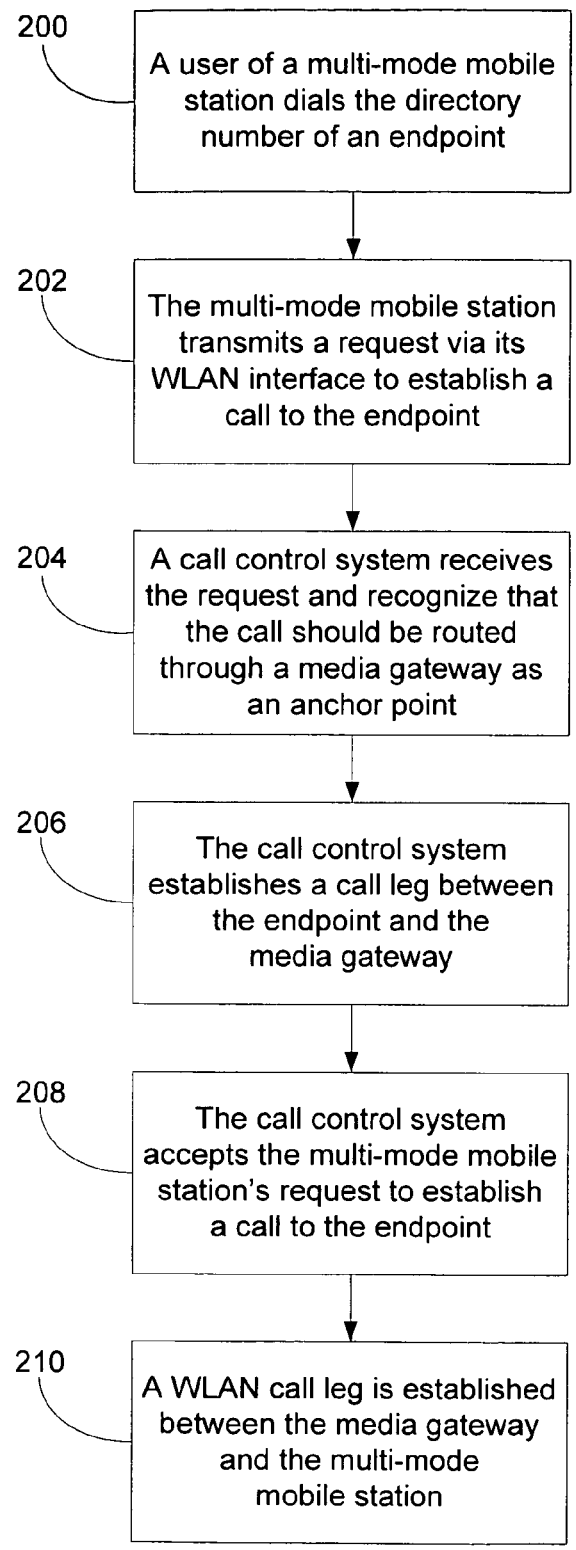
FIG. 4 is a flow chart illustrating a method for establishing a call between a multi-mode mobile station and an endpoint via a WLAN, in accordance with an exemplary embodiment of the present invention.
Figure 5:
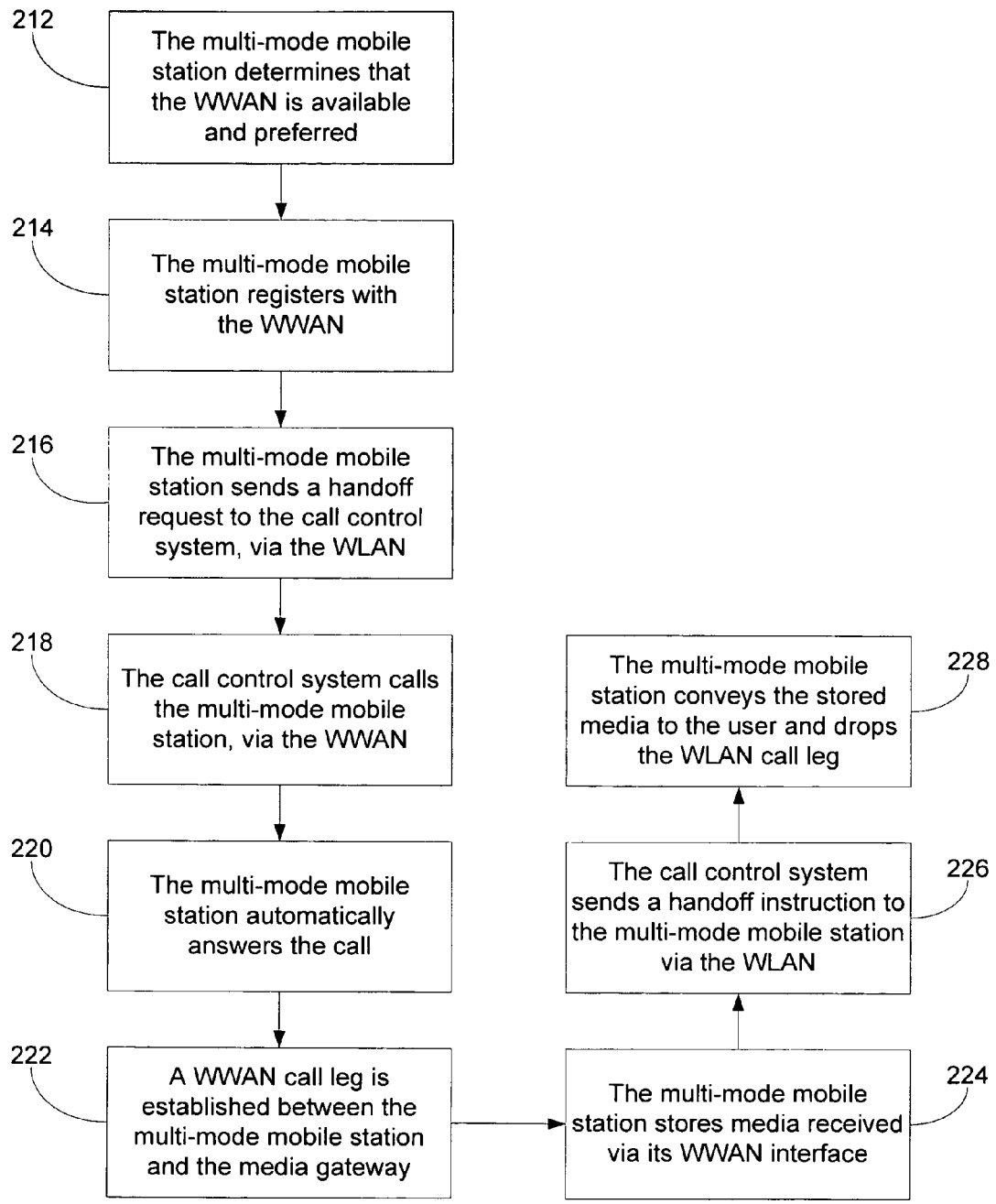
FIG. 5 is a flow chart illustrating a method for handing off the call established in FIG. 4 from the WLAN to a WWAN, in accordance with an exemplary embodiment of the present invention.

FIGS. 2-5 are flow charts illustrating exemplary methods of operation. More particularly, FIG. 2 illustrates an exemplary method of establishing a call from an endpoint to a multi-mode mobile station via a WWAN, using a media gateway as an anchor point for the call. FIG. 3 illustrates an exemplary method of effecting a handoff of the WWAN call established as in FIG. 2 so that the call continues over a WLAN. FIG. 4 illustrates an exemplary method of establishing a call originated by the multi-mode mobile station via a WLAN, using a media gateway as an anchor point for the call. FIG. 5 illustrates an exemplary method of effecting a handoff of the WLAN call established as in FIG. 4 so that the call continues over the WWAN. The examples of FIGS. 2-5 assume the network architecture of FIG. 1. However, it is to be understood that other network architectures could be used.

With reference to FIG. 2, an exemplary process may begin when a caller dials a directory number associated with a multi-mode mobile station (e.g., its MDN), as indicated by block 100. For purposes of illustration, it will be assumed that the caller is calling from a landline station, e.g., landline telephone 56 in FIG. 1. However, it is to be understood that the caller could also be calling from a mobile station, via a WWAN or a WLAN, from a wireline station coupled to a packet-switched network, or from some other endpoint.

A call control system then receives a request to establish the call to the multi-mode mobile station, as indicated by block 102. The request may take the form of call set-up signaling, such as SS7 signaling for calls from PSTN 50 or SIP signaling for calls from packet-switched network 34. Thus, if landline telephone 56 is originating the call, SSP 58 may generate an SS7 Initial Address Message (IAM) message that identifies the multi-mode mobile station, e.g., by its MDN, as the called party. Signaling gateway 70 in call control system 64 may then receive the SS7 IAM message via signaling network 54.

The call control system then determines that the call should be routed through a media gateway as an anchor point, as indicated by block 104. The call control system may make this determination based on the call set-up signaling, e.g., recognizing from the called directory number that the call is to a multi-mode mobile station. In some cases, the call control system may consult a home subscriber server (HSS) or other database to verify that the call should be routed through a media gateway and/or to determine which media gateway to use for the call. The call control system then routes the call to a media gateway, as indicated by block 106.

The call control system may also determine where the called multi-mode mobile station is currently operating, as indicated by block 108. For example, call control system 64 may determine whether the called multi-mode mobile station is currently being served by WLAN 12 or by WWAN 14. To do this, signaling gateway may send an IS-41 LOCREQ message to HLR 48.

In this example, the called multi-mode mobile station is being served by WWAN 14. Thus, in response to the IS-41 LOCREQ message, HLR 48 checks its data record for the called multi-mode mobile station and thereby determines that the called multi-mode mobile station is currently being served by MSC 44. HLR 48 then sends an IS-41 ROUTEREQ message to MSC 44 to obtain a temporary local directory number (TLDN) and forwards this TLDN to signaling gateway 70 in response to the LOCREQ message.

Once it locates the called multi-mode mobile station, the call control system extends the call from the media gateway to the called multi-mode mobile station, via the WWAN, as indicated by block 110. For example, signaling gateway 70 may use the TLDN from the LOCREQ response to route the call through signaling network 54 (e.g., in an SS7 IAM message) from media gateway 60 to MSC 44.

The WWAN receives the signaling to terminate the call to the multi-mode mobile station and, in response, notifies the multi-mode mobile station of the incoming call (i.e., pages and alerts the multi-mode mobile station). The multi-mode mobile station may then answer the call, as indicated by block 112. In this way, a WWAN call leg is established between the media and the called multi-mode mobile station, as indicated by block 114, through which the multi-mode mobile station and endpoint can exchange voice or other media via the WWAN. Thus, landline telephone 56 and media gateway 60 can exchange media via SSP 58 and circuit-switched network 52, and media gateway 60 and multi-mode mobile station 16 can exchange media via circuit-switched network 52 (or IMT 62), WWAN 14, and air interface 40.

FIG. 3 illustrates an exemplary process for effecting a handoff from the WWAN to the WLAN. At some point during the call, the multi-mode mobile station may determine that a different wireless network (e.g., WLAN 12) is available and preferred, as indicated by block 116. The multi-mode mobile station may use any of various methods to determine when to check for availability of the other wireless network. In some cases, the multi-mode mobile station may periodically check for availability, or may do so at the instance of the user. Alternatively, a triggering event may cause the multi-mode mobile station to determine that it should check for availability of the second wireless network. For example, the multi-mode mobile station may use information about its location or movement to determine when to check for availability of the second wireless network. Examples of such approaches are described in U.S. patent application Ser. No. 10/391,158, filed Mar. 18, 2003, titled "Method for Determining Availability of a Radio Network," in U.S. patent application Ser. No. 10/629,406, filed Jul. 29, 2003, titled "Method for Determining Availability of a Radio Network," and in U.S. patent application Ser. No. 10/980,727, titled "Method and System for Triggering Events in a Wireless Network," filed Nov. 3, 2004, which applications are incorporated herein by reference.

Once the multi-mode mobile station determines that the other wireless network is available, the multi-mode mobile station may then determine whether it is preferred. The determination that the other wireless network is preferred could be based on pre-set preferences and/or could depend on various criteria, such as the quality of the link and/or the availability of desired services (e.g., voice service) using the other wireless network.

In response to the determination that the WLAN is available and preferred, the multi-mode mobile station registers with the WLAN, as indicated by block 118. For example, multi-mode mobile station 16 may use its WLAN interface to transmit a SIP REGISTER message to SIP server 68, via WLAN 12. As a result of this registration, call control system 64 will be able to reach multi-mode mobile station 16 via WLAN 12.

The multi-mode mobile station also sends a handoff request to the call control system via the WWAN, as indicated by block 120. The handoff request could be any message that the call control system can recognize as requesting a handoff from the WWAN to the WLAN. For example, the multi-mode mobile station could send a short message service (SMS) message, e.g., an SMS message that requests a handoff and identifies the WLAN interface, to a directory number associated with the call control system.

In response to the handoff request, the call control system transmits a SIP INVITE message to the multi-mode mobile station via the WLAN, as indicated by block 122. The SIP INVITE message invites a voice session between the multi-mode mobile station and the media gateway via the WLAN. Moreover, the SIP INVITE message may include an indication that the SIP INVITE message is part of the handoff process. For example, the SIP INVITE message may include a caller identification that identifies the multi-mode mobile station.

Based on the caller identification or other indication contained in the SIP INVITE message that it is part of the part of the handoff process, the multi-mode mobile station may automatically accept the invited communication session. For example, the multi-mode mobile station may automatically respond to the SIP INVITE message with a 200 OK message, as indicated by block 124. Accordingly, a WLAN call leg is established between the multi-mode mobile station and the media gateway, as indicated by block 126.

With the WLAN call leg established, multi-mode mobile station may begin receiving media via its WLAN interface, e.g., voice or other media sent by landline station 56. Preferably, however, the multi-mode mobile station does not convey this media to the user right away. Instead, the multi-mode mobile station stores any media received via its WLAN interface, e.g., in a buffer, as indicated by block 128, thereby accumulating stored media.

At some point, the call control system sends a handoff instruction to the multi-mode mobile station via the WWAN, as indicated by block 130. The handoff instruction could be, for example, an SMS message that responds to the SMS message that the multi-mobile station transmitted as a handoff request. The call control system may wait to send the handoff instruction until it receives confirmation that the WLAN call leg has been successfully established. Moreover, if the WLAN call leg is not successfully established, then the call control system may respond to the multi-mode mobile station's handoff request with a failure message or may provide alternative instructions.

In response to the handoff instruction, the multi-mode mobile station conveys the stored media to the user and drops the WWAN call leg, as indicated by block 132. For example, in the case of voice media, the multi-mode mobile station may play out the stored media through a speaker. To drop the WWAN call leg, the multi-mode mobile station could transmit a release message, e.g., as if the user had pressed the "END" button.

Once the WWAN call leg is dropped, the multi-mode mobile station continues using the WLAN call leg for the call. In this way, a call handoff is effected from the WWAN to the WLAN. Moreover, because the WLAN call leg is established before the WWAN call leg is dropped, a "soft" handoff can beneficially be effected.

Calls originating from multi-mode mobile stations may also be routed through a media gateway that serves as an anchor point for handoffs between the WLAN and the WWAN, as illustrated in FIGS. 4 and 5. For purposes of illustration, the multi-mode mobile station is initially served by WLAN 12, in these examples.

With reference to FIG. 4, the process may begin when the user of a multi-mode mobile station dials the directory number of an endpoint, e.g., landline telephone 56, as indicated by block 200. In response, the multi-mode mobile station transmits a request, via its WLAN interface, to establish a call to the endpoint, as indicated by block 202. For example, the multi-mode mobile station may transmit (or another network element may transmit on behalf of the multi-mode mobile station) a SIP INVITE message to SIP server 68. The SIP INVITE message may include a Request-URI that identifies the endpoint and may identify the calling multi-mode mobile station, e.g., by MDN, MSID, or ESN.

The call control system receives the request and recognizes (e.g., from an identification of the multi-mode mobile station contained in the request) that the call should be routed through a media gateway as an anchor point for the call, as indicated by block 204. In response, the call control system establishes a call leg between the endpoint and the media gateway, as indicated by block 206. For example, signaling gateway may send an SS7 IAM message to SSP 58 via signaling network 54. This causes landline telephone 56 to ring and, if the call is answered, the call leg between the endpoint and the media gateway is established.

The call control system then accepts the multi-mode mobile station's request to establish a call to the endpoint, as indicated by block 208. For example, the call control system may send a 200 OK message in response to the multi-mode mobile station's SIP INVITE message. Accordingly, a WLAN call leg is established between the media gateway and the multi-mode mobile station, as indicated by block 210, through with the multi-mode mobile station and the called endpoint can exchange voice or other media. In particular, the endpoint and the media gateway can exchange media via SSP 58 and circuit-switched network 52, and the media gateway and the multi-mode mobile station can exchange media via packet-switched network 34, WLAN 12, and air interface 20.

FIG. 5 illustrates an exemplary process for effecting a handoff from the WLAN to the WWAN. At some point during the call, the multi-mode mobile station determines that the WWAN is available and preferred, as indicated by block 212. In response, the multi-mode mobile station registers with the WWAN, as indicated by block 214. For example, if the multi-mode mobile station is operating in an area served by MSC 44, the multi-mode mobile station may transmit a registration message to WWAN, and MSC 44 may responsively send an IS-41 REGNOT message to HLR 48. In this way, HLR 48 is informed of where the multi-mode mobile station is currently operating.

The multi-mode mobile station also sends a handoff request to the call control system via the WLAN, as indicated by block 216. The handoff request could be any message that the call control system can recognize as requesting a handoff from the WLAN to the WWAN. For example, the handoff request could be a SIP UPDATE message that requests an update to the communication session to involve the multi-mode mobile station's WWAN interface in the call.

In response to the handoff request, the call control system calls the multi-mode mobile station via the WWAN, as indicated by block 218. To do this, the call control system may determine where the multi-mode mobile is currently operating. For example, signaling gateway 70 may send an IS-41 LOCREQ message to HLR 48, and HLR 48 may respond with a TLDN, e.g., after querying MSC 44. Signaling gateway 70 may then use the TLDN to route the call, e.g., using an SS7 IAM message, from media gateway 60 to MSC 44. The SS7 IAM message may identify the multi-mode mobile station as the calling party.

In response to the SS7 IAM message, MSC 44 pages and alerts the multi-mode mobile station via its WWAN interface to notify it of the incoming call. The multi-mode mobile station automatically answers the call, as indicated by block 220. In particular, the multi-mode mobile station may recognize from the caller identification contained in the page and/or alert messages that the call is part of the handoff process and may, therefore, answer it automatically. Accordingly, a WWAN call leg is established between the multi-mode mobile station and the media gateway, as indicated by block 222.

With the WWAN call leg established, the multi-mode mobile station may being to receive media via its WWAN interface. However, the multi-mode mobile station does not convey this media to the user right away. Instead, the multi-mode mobile station stores the media received via its WWAN interface, as indicated by block 224.

At some point, the call control system sends a handoff instruction to the multi-mode mobile station via the WLAN, as indicated by block 226. The handoff instruction could be a predetermined response to the SIP UPDATE message that the multi-mode mobile station transmitted as a handoff request. For example, the handoff instruction could be provided as a SIP response that includes "222" as the numeric Status-Code and "Initiate Soft Handoff" as the associated textual Reason-Phrase. The call control system may wait until it receives confirmation that the WWAN call leg has been successfully established before sending the handoff instruction. For example, call control system 64 may wait until it receives an SS7 Answer Message (ANM) from MSC 44 before transmitting the handoff instruction.

In response to the handoff instruction, the multi-mode mobile station conveys the stored media to the user and drops the WLAN call leg, as indicated by 228. Thus, in the case of a voice call, the multi-mode mobile station plays out the stored media through a speaker. To drop the WLAN leg of the call, the multi-mode mobile station may de-register with SIP server 68. For example, the multi-mode mobile station may transmit a SIP REGISTER message with an expiration period of 0. Alternatively, the multi-mode mobile station may transmit a SIP BYE message.

Once the WLAN call leg is dropped, the multi-mode mobile station continues using the WWAN call leg for the call. In this way, a soft handoff from the WLAN to the WWAN is effected.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for call handoff between a first wireless network and a second wireless network for a multi-mode mobile station, said multi-mode mobile station including a first interface for wireless communication with said first wireless network and a second interface for wireless communication with said second wireless network, said method comprising:

while said multi-mode mobile station is engaged in a first communication session with an endpoint via said first interface, said multi-mode mobile station transmitting a handoff request via said first interface;

said multi-mode mobile station receiving media via said second interface after becoming engaged in a second communication session with said endpoint via said second interface;

said multi-mode mobile station storing said media, thereby accumulating stored media;

said multi-mode mobile station receiving a handoff instruction via said first interface; and in response to said handoff instruction, said multi-mode mobile station conveying said stored media to a user and dropping said first communication session.

2. The method of claim 1, wherein said first wireless network is a wireless local area network (WLAN) and said second wireless network is a wireless wide area network (WWAN).

3. The method of claim 1, wherein said first wireless network is a wireless wide area network (WWAN) and said second wireless network is a wireless local area network (WLAN).

4. The method of claim 1, wherein said first communication session is a first call leg of a voice call involving said multi-mode mobile station and said endpoint, and said second communication session is a second call leg of said voice call.

5. The method of claim 1, further comprising:
while said multi-mode mobile station is engaged in said first communication session, said multi-mode mobile station determining that said second wireless network is available and preferred.

6. The method of claim 1, wherein said handoff request requests establishment of said second communication session with said endpoint via said second interface.

7. The method of claim 6, wherein said handoff request is a SIP UPDATE message.

8. The method of claim 7, wherein said handoff instruction is a predetermined response to said SIP UPDATE message.

9. The method of claim 1, further comprising:
said multi-mode mobile station establishing said second communication session with said endpoint via said second interface.

10. The method of claim 9, wherein said multi-mode mobile station establishing said second communication session comprises:
said multi-mode mobile station registering with said second wireless network;
said multi-mode mobile station receiving an incoming call request via said second interface; and
said multi-mode mobile station automatically answering said incoming call request.

\* \* \* \* \*